United States Patent Office 3,483,557
Patented Dec. 9, 1969

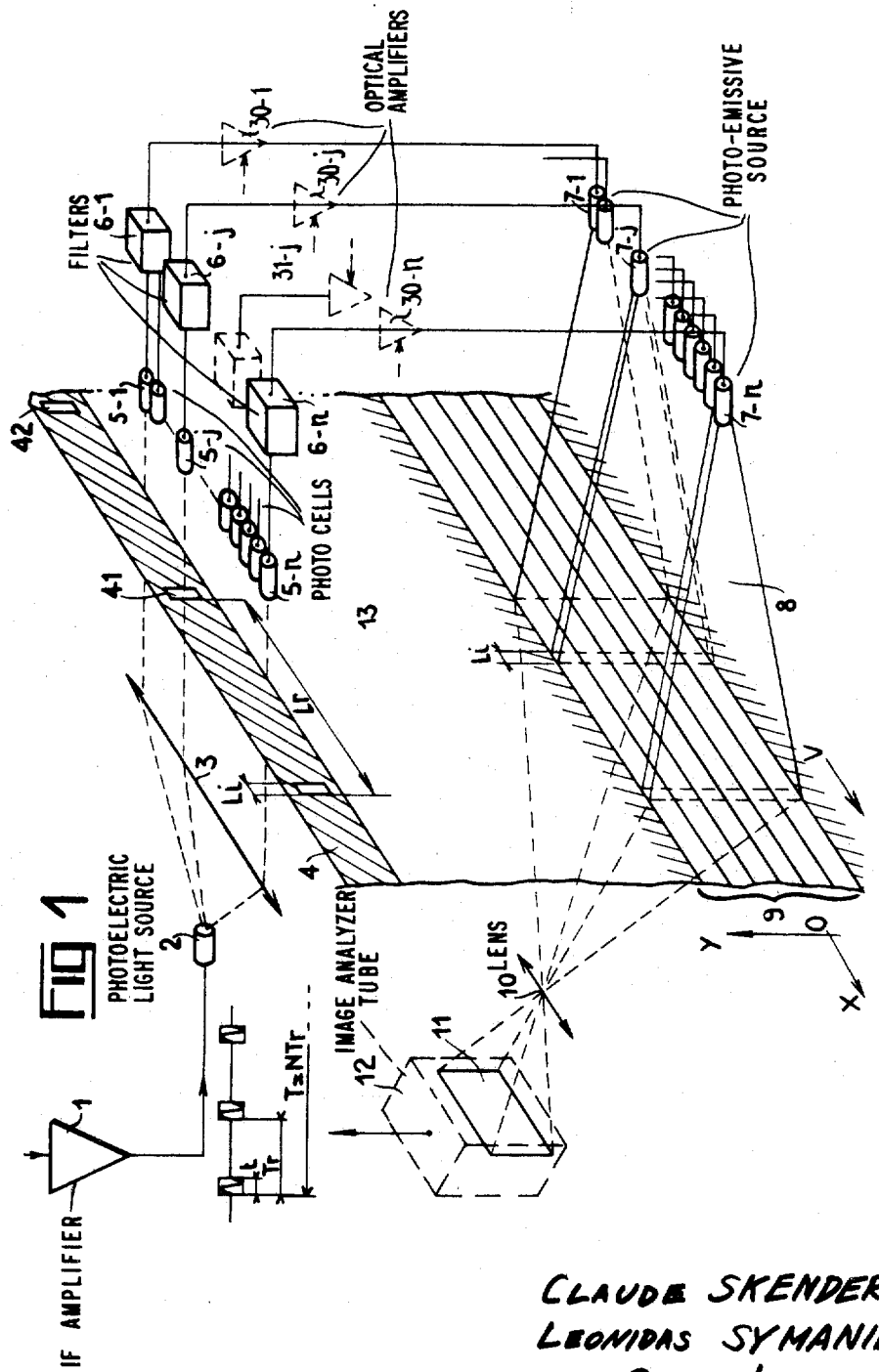

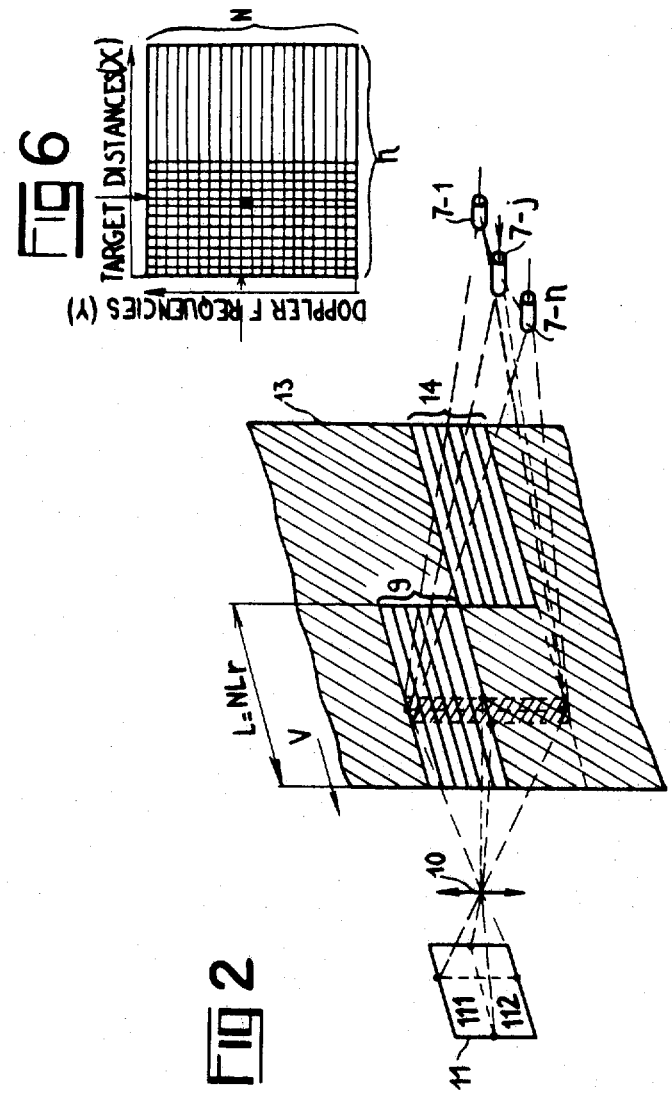

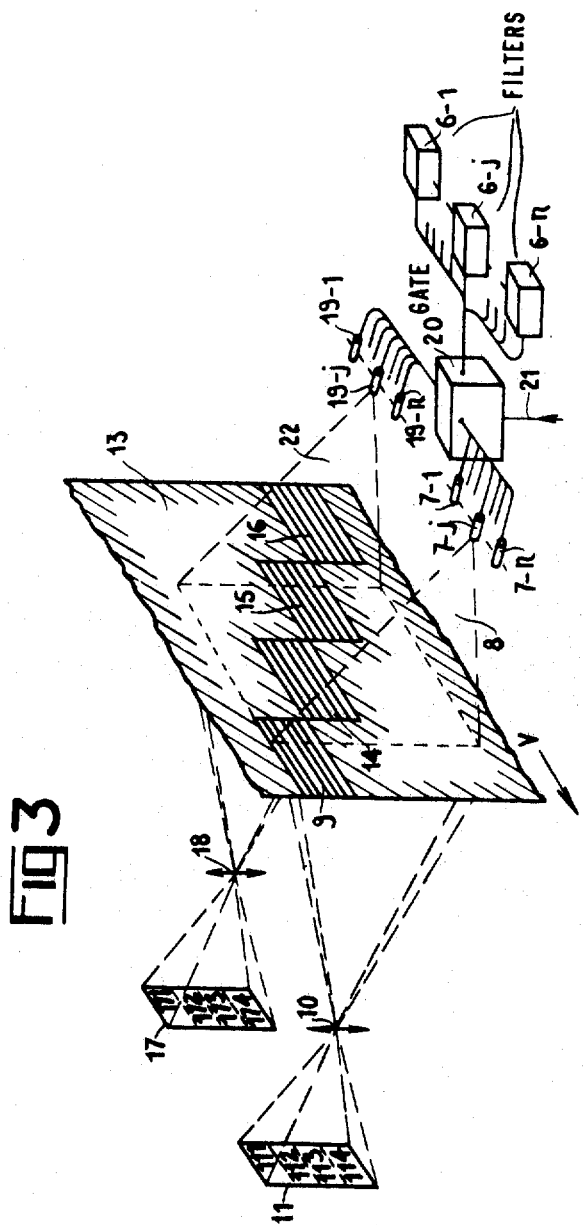

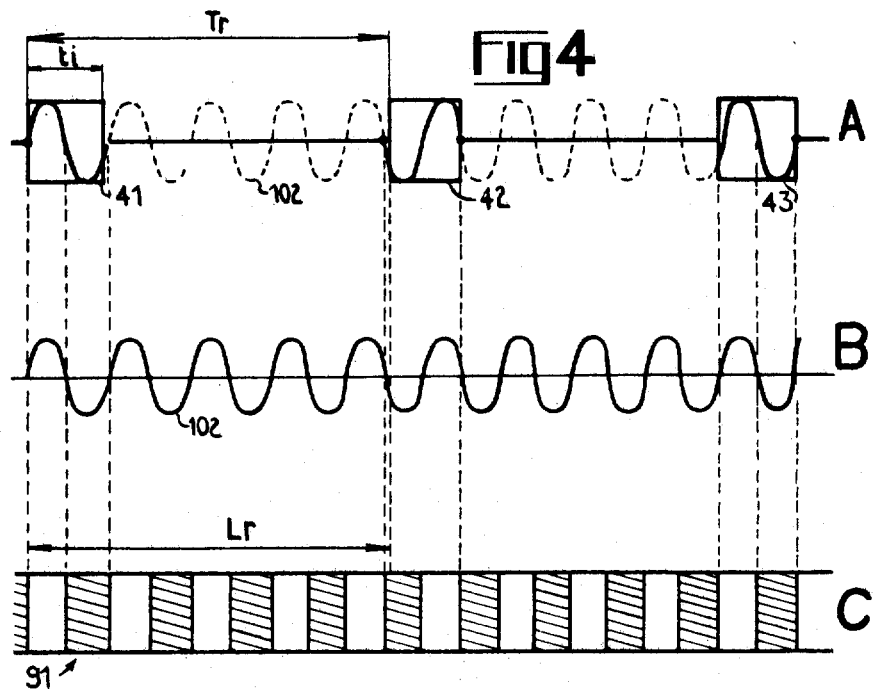
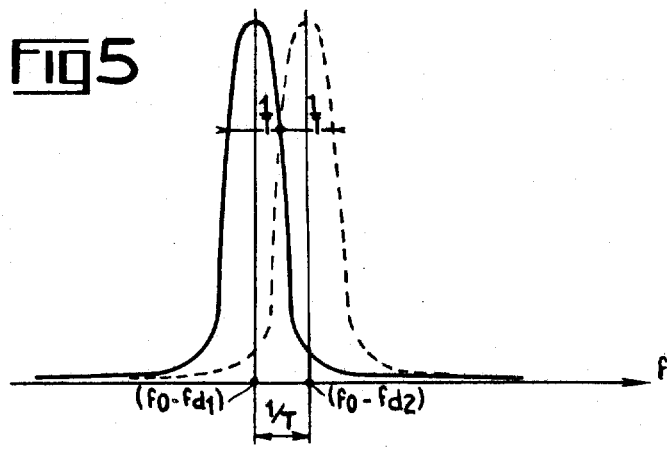

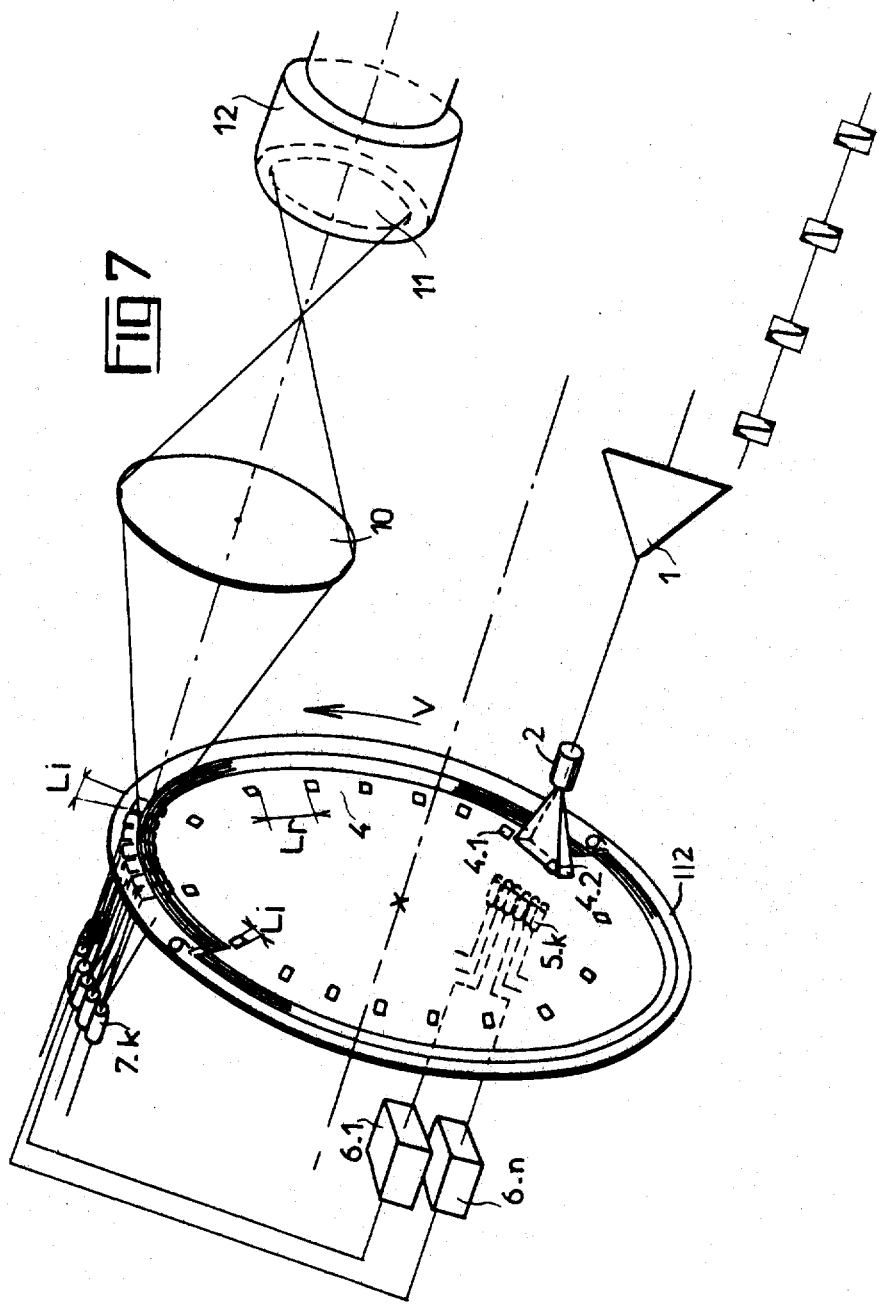

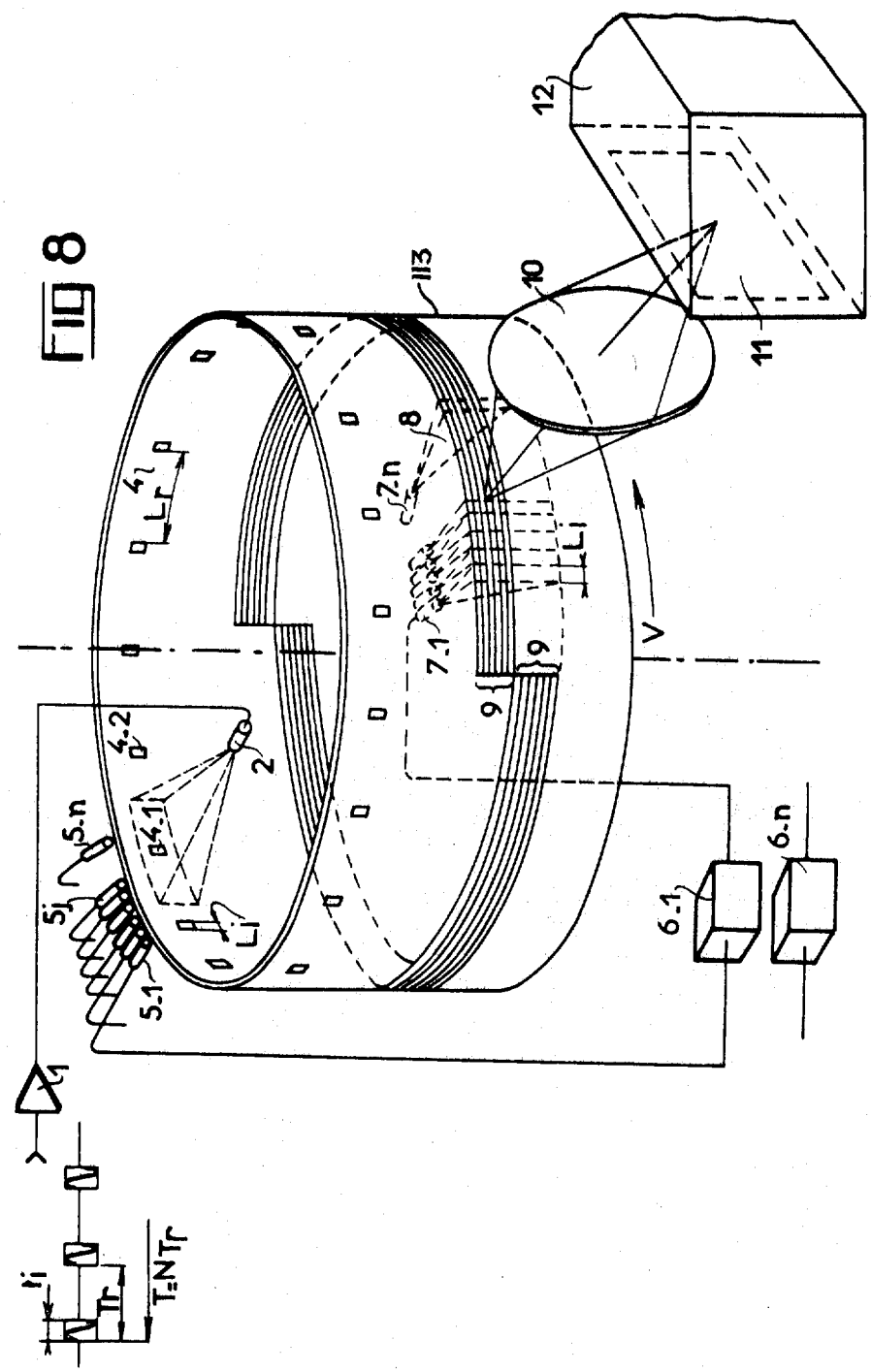

3,483,557
RADAR RECEIVER HAVING IMPROVED OPTICAL CORRELATION MEANS
Claude Skenderoff, Reuil-Malmaison, and Leonidas Symaniec, Sartrouville, France, assignors to Compagnie Francaise Thompson Houston-Hotchkiss Brandt, Paris, France
Filed Apr. 10, 1968, Ser. No. 720,042
Claims priority, application France, Apr. 19, 1967, 103,303
Int. Cl. G01s 9/44
U.S. Cl. 343—9             20 Claims

ABSTRACT OF THE DISCLOSURE

A received radar signal applied through I-F stage 1 modulates a light source 2 and the modulated beam is passed through record track 4 having spaced transparent areas 41, thereon, corresponding in width and spacing to the width and repetition period of the transmitted radar pulses. The beam traversing track 4 strikes a particular photocell in array 5, depending on target distance. The outputs from photocells 5 are passed through filters 6 and reconverted to light beams in photo-sources 7. The beam from the energized photosource 7 illuminates a transverse set of Doppler selection channels 9 recorded on the same moving carrier 13 as distance-selection track 4, said channels having various Doppler frequencies recorded thereon as opaque/transparent areas of various pitch spacings. The output beam traversing a particular Doppler channel 9 is received and integrated on an image tube photocathode 11 to display a spot whose coordinates indicate target distance and relative velocity, FIGURE 1.

---

This invention relates to radar systems of the so-called correlation type. Correlation radars are a fairly recent development of great importance. Radar theory demonstrates that this type of system enables the attainment of higher signal to noise ratios than any other type of radar system.

The underlying principle of a correlation radar system consists in transforming the received radar signal returned from the target, into its auto-correlation function, of the form $$F(t_0 - t_1) = {}_T\!\int S(t - t_0) S(t - t_1) dt$$

where $S(t - t_0)$ represents a received radar signal, and $t_1$ designates a constant delay time. Denoting $t_1 - t_0 = \tau$ the function becomes $$F(\tau) = \int_T S(t) S(t - \tau) dt$$

As will be evident, the transformation may involve, first, multiplying the return radar signal and a replica of the corresponding transmitted radar signal, and then integrating the product over a period T.

In the case of a pulse radar system the integration period T is preferably taken as the period during which the antenna beam scans the target, which period represents a substantially constant number of transmitted pulses.

In conventional correlation radar systems, the autocorrelation transformation defined above, is generally performed electronically. The return signal, after suitable amplification, is applied to one input of each of a series of multiplier or gate circuits, the other inputs of which are fed with the parallel outputs of an electronic delay line receiving at its input the radar transmission pulses. The output from each of the gate circuits is passed through a parallel set of LC filters for performing the integration step, the center frequencies of the filters in each set corresponding to the respective Doppler shift frequencies that are expected over the expected range of target radial velocities.

Correlation radar systems of the kind just described have suffered from a serious handicap in that the great number of filter circuits required has enormously increased the bulk and weight of the system. This has been especially true in the case of pulse Doppler radar systems for the sensing of low-flying targets, because of the necessity of reliably filtering out the echos from stationary ground targets, which echos may be as much as several million times in strength the echos from the moving targets to be detected.

For example, in such a system having 32 distance channels and 50 different Doppler channels per distance channel, there would be required $32 \cdot 50 = 1600$ Doppler filters each having a stationary-echo attenuating capacity of 60 to 70 db. Further, the space consumption rises very sharply as the number of distance and Doppler channels desired increases.

An object of the invention is to provide a new correlation device for use in radar receiver and analogous systems which will utilize optical, rather than purely electrical, means for transforming the received signal into its autocorrelation function. Another object is to provide high-performance radar receiver systems, particularly though not exclusively pulse-radar Doppler systems for low-altitude targets and other exacting applications which shall, through the use of optical correlating means, be enormously smaller and lighter than comparable systems of conventional construction.

According to an aspect of the present invention, the received radar signal, after suitable amplification, is used to modulate a light beam. This modulate beam is flashed over a moving distance-selection code track which simulates the radar transmission pulses as spaced transparent areas or slots along the code track. The beam traversing the track is received by a particular photocell of an array thereof distributed over the illuminated region, and the position of the particular cell that is energized indicates target distance.

According to another aspect of the invention, a light beam modulated in accordance with a received radar signal is flashed across a moving Doppler selection track which comprises a transverse set of Doppler channels each coded to simulate the various Doppler shift frequencies corresponding to the range of expected target radial-velocities. The beam traversing the Doppler selection track is received and integrated, and its transverse coordinate represents the Doppler shift component in the received signal.

As will be apparent, both aspects just indicated can readily be combined. In that case, the output beam, as modified both by the distance-selection code and the Doppler selection code, is received on a two-dimensional matrix array of receiver elements, e.g. on the photocathode surface of an image-analyzer tube (which then will simultaneously perform the final integration of the output signal), so that the longitudinal and transverse coordinates of the displayed signal will respectively indicate the distance and the radial velocity of the target.

In the accompanying exemplary drawings:
FIG. 1 is a schematic illustration of a pulse Doppler radar receiver system according to the invention;
FIG. 2 is a partial view illustrating a modification of the Doppler selection section of the system of FIG. 1;
FIG. 3 similarly illustrates another modification of the Doppler selection section;
FIG. 4 shows, in three lines, three wave forms illustrating principles of the optical correlation method of the invention;
FIG. 5 illustrates a theoretical response curve of an optical Doppler filter according to the invention;

FIG. 6 illustrates schematically an output display obtainable with the system shown in FIG. 1.

FIG. 7 illustrates an embodiment of the invention using a disc as record carrier, and FIG. 8 illustrates an embodiment of the invention using a drum as a record carrier.

Referring to FIG. 1, there is shown an I-F amplifier stage 1 which may form part of a generally conventional pulse Doppler receiver system, not shown in detail, so as to receive at its input a pulsed echo signal returned from a target. The output from I-F amplifier 1 is applied to a modulating input of a conventional photo-electric light source 2, such as a diode emitting light, whereby the source 2 produces a light beam that is modulated in intensity, preferably in substantially linear manner, in accordance with the output of amplifier 1.

The modulated light beam from photo-source 2 is passed through collimator optics 3 and the light beam from optics 3 serves to illuminate an area of predetermined length along a so-called distance-selection track 4 formed on a suitable supporting medium 13 which is displaced at a uniform velocity V, as indicated by an arrow. The distance selection track 4 may consist of a strip of photographic emulsion which is generally opaque except for a uniform series of narrow transparent areas such as 41, 42 formed in spaced relation along the length of the track; the track 4 may conveniently be formed on a revolving disc 112 (FIG. 7) or drum 113 (FIG. 8) which would then constitute supporting medium 13.

The transparent areas formed along track 4 constitute a series of so-called "space pulses" which correspond in width and, spacing, to the width and repetition period of the train of radar pulses that is transmitted by the transmitter (not shown) of the radar system. Specifically, the said space pulses such as 41, 42, have a uniform width $L_i$ and a uniform spacing $L_r$ such that $$L_i = Vt_i \text{ and } L_r = VT_r$$

where $t_i$ designates the pulse width of the transmitted radar pulses $T_r$ designates the repetition period of said transmitted radar pulses, and V is the linear velocity of displacement of the record track 4. Further, the total length L of the distance-selection track 4 which is cyclically and repeatedly fed by the photo-source 2 is selected equal to once (or an integral number of times) the product $L=VT$ where T designates the time of irradiation of a target by the radar antenna.

The above relations further indicate that the total number $n$ of space pulses 41, 42 . . . on the distance selection track 4 is given by the equation $n$ $$n = T/T_r \text{ or } n = L/L_r$$

It will be understood that the distance-selection code track 4 may, and preferably does, serve to command the transmission of radar pulses from the radar transmitter.

Positioned beyond the distance-selection track 4 is an array of identical receiver photo-cells 5, spaced along the longitudinal coordinate of the track 4, and numbered from 5–1 to 5–$n$. As will be readily understood the longitudinal coordinated represents target distance. The collimator optics 3 is arranged to spread out the modulated light beam from source 2 an amount, as measured along said longitudinal coordinate, that corresponds to the full range of the radar system. It is noted at this point that optics 3, though conventionally shown as a lens, preferably takes the form of a bunch of optical fibres or light conductors. The longitudinal extent of the array of receiver photo-cells 5–1 to 5–$n$ corresponds to said system range. The pitch spacing between adjacent cells in the array, and hence the number of cells used, is determined by the distance resolution of the system. Reviewing the operation of the part of the system so far described it will be understood that every return signal pulse received from a given target and passed through I-F amplifier 1 produces a burst of light from light source 2, which through optics 3 illuminates for a brief instant of time (corresponding to $t_i$) an expanse of the moving record track 4 of length $L_r$ as shown. During this light burst or pulse, there is a single one of the transparent slots, say slot 41, positioned within said expanse $L_r$ at a well-defined position therein, so that the light energy is passed through said slot 41 and falls on the particular photo-cell of the array 5 that corresponds to the position of said slot at the instant of the burst, say photo-cell 5–$j$.

On reception of the next radar pulse from the same target, i.e. a time $T_r$ later, the record track 4 has advanced by the amount $L_r$, so that the next slot 42 recorded thereon is now positioned at a position substantially corresponding to that of slot 41 during the previous pulse, so that the fresh light pulse is now passed by slot 42 to the same receiver cell, 5–$j$, as before.

Similarly, over the whole series of N radar return pulses received from the target, i.e. over the time $T=NT_r$, all N corresponding light pulses will be received on a common one of the photocells 5 as determined by the target distance. Thus the serial number of that photo-cell of the array which responds to all the light burst in every antenna scan cycle provides an indication of target distance.

The outputs of all the photo-cells 5 representing distance selection channels, are passed through respective filters 6 (6–1 to 6–$n$) which serve as stationary-echo rejectors. It is noted that the filters 6 though preferably provided in the system of the invention, serve only a more specific problem and may in many cases not be contemplated. When used, as here shown, they can be provided in the form of very simple and small-sized filter networks of conventional type.

The outputs of filters 6 are connected by way of optical amplifiers 30 to the inputs of respective photo-emissive sources 7 (7–1 to 7–$n$) which effect a reconversion of the signal from electrical to optical form as will become clear later. Each source 7 has an optics 8 associated with its output, preferably in the form of a bunch of optical fibers, which converts said output beam into a flat, and as here shown vertical, light beam. Sources 7 may be carried out as juxtapositioned bars according to the integrated circuits technique. The image of the linear source assembly may be projected, by means of a conventional optical system with suitable magnification, onto the engraved plane of the Doppler tracks. The beams from all the photo-sources 7 are directed across a so-called Doppler selection track 9, which is moved in a direction parallel to the array 7, in this instance at the same linear velocity V as the distance track 4. While the distance and Doppler selection tracks 4 and 9 may well be formed on separate carriers, such as discs or drums, both tracks are here shown as supported on a common carrier 13, and this arrangement is preferred.

The Doppler selection track 9 includes a series of parallel elementary channels, corresponding in number to that of the Doppler frequencies to be indicated, herein 50. Each elementary Doppler track is formed as an alternating series of opaque and transparent sections, wherein the pitch of the transparent areas corresponds to the cycle period of a particular Doppler frequency. In the example, Doppler selection track 9 includes 25 channels including positive Doppler frequencies and 25 sub-tracks including negative Doppler frequencies.

Thus the flat vertical light beam issuing from the particular one of the light sources 7 that was energized (i.e., source 7–$j$ using the earlier terminology) simultaneously strikes all of the (fifty) sub-tracks of Doppler selection channels 9. Since the modulation frequency of the light beam from the energized light source 7–$j$ represents the Doppler frequency component in the received radar signal from the particular target being scanned, it will be apparent that, by an effect akin to stroboscopy, only that one of the Doppler channels in which the pitch spacing of the transparent areas corresponds in value to the Doppler cycle period in the received signal, will pass the light beam. Furthermore, throughout each particular target scanning period as determined by the antenna scan cycle, the light will be constantly traversing the same elementary position of said Doppler channel, as determined by the particular one (7–j) of the photo-sources 7 that is energized during that scanning period as earlier described, and hence, as determined by target distance.

On the far side (left in FIG. 1) of Doppler selection track 9 light pick-up and integrating means are provided. Such means, in a simple and usable form of the invention, may take the form of a two-dimensional rectangular matrix array of separate photo-diodes each registering with a particular elementary position of the rectangular area capable of being illuminated from the set of photo-sources 7 through Doppler track 9. In the example, there would be 50 · 32=1600 such receiver diodes, associated with suitable delay or integrating means selected to perform the desired integrating action over each target scan period.

With this simple arrangement, it will be evident that the position of the particular photo-diode of the receiver array that stays illuminated during the target scan period will indicate, by its horizontal (or longitudinal) coordinate in said array, the distance of said target, and will indicate by its vertical (or transverse) coordinate the Doppler frequency of the response signal received from said target. Such an array of receiver photo-diodes may then be used to produce a visual display, of the kind schematically indicated at FIG. 6, in which it will be apparent that the position of the illuminated diode, indicated in the drawing as the small shaded rectangle, readily provides the desired data in visual form. If desired however, the data given by the positional coordinates of the energized diode in the array may be exploited in any other suitable way, as by application to digital computer and/or control facilities.

Instead of using a two-dimensional array of separate photo-diodes as just described, in the form of the invention schematically shown in FIG. 1, the light from all the elementary areas illuminable through Doppler track 9 is collected by suitable optics schematically indicated as a lens 10 but which, in practice, would preferably take the form of a bunch of fiber-optical light conductors, and applied thereby to the photo-cathode surface 11 of an image-analyzer tube 12 which may be of a conventional type, such as a Vidicon or Image-Orthicon.

In such a tube, a pencil of electrons from an electron gun is made to scan a target surface positioned opposite the illuminated photocathode surface, and generates a video signal which indicates the position of the charge accumulation on the latter surface as determined by its illuminated area. As in the diode-array embodiment last described, the video signal data given by the image-tube embodiment may be exploited visually and/or otherwise, say for digital remote control.

From the foregoing, the general operation and outstanding advantages of a Doppler receiver system provided with the improved opto-electrical correlating means of the invention will be manifest. The operating process can be synoptically reviewed as follows.

In a first step, the received radar signal (after conversion to an intermediate frequency) is converted from electrical to optical form, and in this form is compared stroboscopically with an optical-code target-distance reference signal recorded on distance-selection track 4, the result of this comparison appearing as the longitudinal position coordinate of the output optical signal from track 4. This optical signal is reconverted to electrical form, subjected to ancillary electrical filtering and amplifying steps, and again converted to an optical signal, is then stroboscopically compared with an optical Doppler-frequency reference signal recorded on Doppler-selection track 9, and the result of this further comparison appears as the transverse position coordinate of the output optical signal from track 9. The longitudinal and transverse coordinate data, each of which is integrated over a period of target-irradiation in one antenna scan cycle, are thus both made simultaneously available at the output device, such as an image-analyzer tube 12, to provide a highly accurate indication of target distance, and target radial velocity, respectively.

The stroboscopic comparison steps that are performed between the whole series of received radar response pulses back from the target during one scan period, and the reference signals recorded in optical form on the respective tracks 4 and 9, are equivalent to very precise and sensitive filtering operations which, if they were to be performed through conventional filtering means, would entail the use of enormously more cumbersome equipment.

An alternative way of describing the operation of the invention is in mathematic terms of the auto-correlation function of the received signal. The auto-correlation function of a received signal $s(t)$ can be written in the general form $$F(\tau) = \int_T S(t) S(t-\tau) dt \tag{1}$$

as previously seen. It is shown in modern radar theory that if the received signal is transformed into an auto-correlated signal of the form indicated by Equation 1 the signal/noise ratio at the system output is maximized, i.e. maximum intelligence is extracted from the incoming radar signals.

The system of the invention performs the above transformation through opto-electrical means both as regards the distance and the radial-velocity information contents of the incoming signal. A study of Equation 1 shows that the transformation involves, first, forming the product of the each incoming radar pulse and a delayed replica thereof; then, integrating (averaging) all the individual pulse products over a full period of target illumination. In the system disclosed, a record of the characteristics of the transmitted pulses is provided in the form of optical transparencies in the record medium, so that when a light beam modulated in accordance with the received signal is passed through such a record, the output light beam will represent the product of input light-intensity times record transparency, and hence will indicate the desired product of received-pulse times transmission-pulse. The system further performs the integrating step as earlier described.

In the system of FIG. 1, it will be noted that there exists a period in each signal processing cycle when the target surface of image tube 12 is being scanned by an electron beam in order to read the integrated information stored on said surface in the form of electric charges transferred thereto from the illuminated photocathode. During this "read" period, no further information can be received in the form of light on the photocathode of the tube, and the radar system therefore would be blind to a target scanned during such a period.

In modified forms of the invention this limitation is entirely overcome by providing more than one Doppler-selection tracks, which are alternatively used. For this purpose it would be feasible to provide two, separate, parallel Doppler tracks such as 9 on the record medium 13, each associated with an array of photo-tubes such as 7, and switching means, mechanical or electronica in character, for sequentially and alternatively enabling each photo-tube array while disabling the other. Preferably however, the switching requirement is eliminated by using the modification shown in FIG. 2.

In FIG. 2 the record medium 13, such as the periphery of a drum 113 (FIG. 8), is shown subdivided into two full Doppler-selection tracks 9 and 14, each having the full length L corresponding to a target-irradiation period, and the two tracks being displaced with respect to each other in the direction of displacement as well as being offset in the transverse direction as shown. A single array of photo-tubes 7 is provided, with the vertical or transverse extent of the light beam from each tube corresponding to the combined width of both tracks 9 and 14. The output beam on the far side of carrier 13 is taken up by an optics 10 and passed to respective receiving and integrating surface arrays 111 and 112, which desirably are separate areas of a common photocathode surface 11 of a single image tube of the type earlier referred to, both areas being continuously scanned with the total scanning cycle for each area substantially corresponding to the signal period T. However, in a modification especially suitable where high-remanence, e.g. Vidicon, tubes are used, the separate areas 111 and 112 may be provided on separate tubes successively scanned within the period T. The angular velocity of the record carrier 13, such as a drum, would in the case of FIG. 2 be made twice less than in the embodiment of FIG. 1.

FIG. 3 illustrates a further modification which makes it possible, if desired, to use analyzer tubes having even higher remanence times. The record carrier 13 in this example has four complete Doppler selection tracks 9, 14, 15, 16 formed in transversely offset relation along its length. There are further provided two similar arrays of photoemissive tubes 7 and 19, each similar to the array designated 7 in FIGS. 1 and 2, said arrays being displaced longitudinally from each other a distance corresponding to one half the total length of the four tracks 9, 14, 15, 16. The transverse extent of the light beam from each tube is the combined transverse width of the Doppler tracks. Associated with each of the phototube arrays on the far side of the record carrier 13 is an optics 10, 18 respectively, and a related image tube, e.g. a Vidicon, whose photocathode is indicated at 11 and 17 respectively.

Electronic gate circuitry conventionally indicated at 20 is provided for selectively switching the outputs of the rejector filter array 6 (also see FIG. 1) either to the related phototube inputs of array 7 or to the related phototube inputs of arrays 19, in dependency on a switching control signal applied at input 21 of gate unit 20, which control signal is preferably derived from an auxiliary track provided on record medium 13 and associated with conventional photoelectric pickup means not shown. In operation, the control signal is delivered to switching input 21 every four signal cycles, i.e. once every 4T period. Assuming a first period in which phototube array 7 is gated to the outputs of filters 6, then the associated photo-cathode 11 receives and integrates the beam from that array. As the record medium 13 moves past photocathode 11, the light beams passed through the four Doppler selection tracks 9, 14, 15, 16 are applied to the four sections 111, 112, 113, 114 of the photocathode in succession, with each section containing a beam therein for one T period. After all four sections of cathode 11 have been traversed, a switching control signal applied to input 21 disables the phototube array 7 and enables array 19, whereupon a similar operating cycle proceeds over the following 4T period in respect to photocathode 17, and so on.

In each of the two image tubes, the scanning cycle is so controlled that the reading period in each quarter section of the tube (e.g. section 111) commences immediately after that quarter section has completed the integration of the light beam, that is, the vertical scanning cycle for the tube is initiated a time T after the start of the complete illumination cycle relating to the tube. In this way, it will be evident that it is sufficient that the remanent charges on each tube will have reduced substantially to zero, a time 18T after the photocathode has been illuminated; hence tubes, such as vidicons, having long remanence characteristics can readily be used.

A clarification of the operation of the invention as described with reference to FIGS. 1–3 will now be given with reference to FIG. 4. In the uppermost line A are shown three consecutive transparent areas 41, 42, 43 of the distance-selection track 4. The sine-wave shown generally dotted at 102 represents the (demodulated) carrier of the radar return signal, and the full-line portions of the sinewave appearing through the transparencies 41, 42, 43 represent three consecutively received radar return pulses from a target. It will be observed that the sinewave pulse in transparency 42 is 180° phase-displaced with respect to that in 41. Since the spacing between adjacent transparencies corresponds with the repetition period ($T_r$) of the transmitted radar pulses, it will be evident that the phase-displacement just noted is due essentially to the Doppler shift component present in the return signal, i.e. the target's radial velocity. Line B shows the same return signal, affected with Doppler shift, as it is applied after fixed-echo rejection and amplification in stages 6 and 30 to modulate the light beam from a particular one of the phototubes 7. Line C illustrates as 91 the particular one of the channels comprising Doppler selection track 9 in FIG. 1, through which the light beam modulated in accordance with the sinewave 102 of line B will pass, as evidenced by the fact that the transparent (non-shaded) areas of the Doppler channel 91 are all positioned in register with the positive peaks of the sinewave 102. It will be understood that channel 91 is one of a series of transversely-spaced such channels together forming the Doppler-selection track 9 (FIG. 1) and all having incrementally differing pitch values. Thus, the transverse position coordinate of the operative sub-track across the track 9, as visualized e.g. by the vertical coordinate on the display shown in FIG. 6, is an indication of the Doppler shift in the received radar signal.

It will thus be seen that the second portion of the system of FIG. 1 including Doppler selection track 9, constitutes in effect an optical Doppler filter. The output frequency spectrum of this filter is given by the auto-correlation Equation 1 written above, and is substantially of the form indicated by the full-line curve in FIG. 5, for a given Doppler shift frequency $f_{d1}$. The passband value of the filter is given by the lobe width $1/T$ as shown. FIG. 5 also shows in dotted lines a similar spectral curve relating to a different Doppler shift $f_{d2}$. It will be seen that in order to separate the two curves, it is necessary that the difference in Doppler shifts $\Delta f = f_{d2} - f_{d1}$ is not less than $1/T$. This quantity, therefore, sets the maximum Doppler resolution in a system according to the invention, and fixes the preferred number of Doppler channels used herein. This is given by $2N_d = f_r / \Delta f$, where $f_r$ is the radar pulse repetition rate.

In actual operation, second-order effects are naturally present which tend to obscure the clearcut theoretical operation so far described. Probably the chief such effect stems from the fact that the beam from the energized phototube 7 (FIG. 1) traverses to a small degree other among the Doppler channels 9, than the one channel 91 it is supposed to traverse. These second-order light beams, after integration, constitute cross-correlation products which combine with the true auto-correlation product given by Equation 1, and detract from the optimal nature of the output signal. Stated otherwise, the output spectrum from the optical Doppler filter of the invention, instead of having the ideal form indicated by the full-line curve of FIG. 5, includes minor side lobes to either side of the curve shown. In Doppler radar applications requiring particular high performance, this defect may be readily corrected or reduced by suitably modifying the transparency values of the opaque and transparent areas of the Doppler channels. Instead of providing the alternate areas completely transparent and completely opaque (transparency 1 and 0 respectively) as shown e.g. in FIG. 4C, intermediate values of the transparency coefficient are used in consecutive areas of the record medium, so predetermined that the sequence of transparencies will simulate the desired Doppler shift frequency modified in accordance with some desired weighting function, as given e.g. by Taylor's or Hamming's law. As will be readily understood by those familiar with statistic information theory, such a procedure will make it possible greatly to depress or completely to suppress the unwanted sidelobes in the output spectrum curve and simulate closely the ideal curve shown in FIG. 5.

Some characteristics of the system may be given, which do not limit at all the scope of the invention.

The record carrier 13 was provided in the form of a glass drum 113 (FIG. 8) with a diameter $D=300$ millimeters, rotated from a motor the speed of which is accurately controlled. The various optical record tracks were obtained round the drum periphery by photographic exposure of a light-sensitive emulsion directly deposited on the glass surface.

The distance-selection track 4 consisted of 100 transparent areas or slots each having a width $L_1 = 0.295$ mm. uniformly spaced round the drum periphery with a pitch length of $L_r = 9.42$ mm. There were provided two alternately displaced Doppler selection tracks 9 and 14 (according to the embodiment of FIG. 2), each track including fifty Doppler channels, with the number of transparent areas per channel varying incrementally by two digit increments in adjacent channels of each track. Thus there were 25 negative channels respectively containing 3122, 3124, 3126, ... to 3170 transparent areas, and 25 positive channels respectively containing 3172, 3174, 3176, ... to 3220 transparent areas. The drum periphery further included auxiliary record tracks, including a clock or synchronizing track and a start-transmission command track.

The modulable photo-source 2 was a gallium arsenide diode emitting in the near infrared band, with a crest power of 70 and a form factor of ½. The diode 2 was positioned inside the drum 13 and a bundle of optical fibres (the optics 3, FIG. 1) spread out the light beam from the diode so as to cover an arc about 9.42 mm. in length (the length $L_r$) along distance track 4. Outside the drum and in register with the illuminated arc thereof was disposed the array of thirty-two photo-cells 5. The array of thirty-two modulable light sources 7, which are gallium arsenide diodes similar to source 2, were likewise positioned within the drum in general register with the common circumference of Doppler selection tracks 9 and 14, and the associated optics 8 comprised an array of flat diverging bundles of optical fibres covering the combined arcuate extent of tracks 9 and 14. With each of the auxiliary record tracks was associated a continuously energizable light source positioned outside the drum, and a cooperating pickup photocell positioned inside the drum. The output device 12 was in this case a low-remanence Image Orthicon tube. The scanning cycle of the tube was controlled to provide a complete vertical scan period of $2T = 10.6$ ms., with $2N = 100$ horizontal lines per cycle, and a definition of $n = 64$ points per horizontal line. It is worth noting that with the scanning conditions just indicated the operation of the output image tube is greatly simplified over that of a similar tube in a TV system, and that a video passband of only 1 megacycle will be amply sufficient, as against about 7 mc. required for a TV system using 625 line definition.

The fixed-echo rejector filters 6 consisted of electronic bandpass and band-cutoff networks attenuating the signal frequencies outside the useful Doppler frequency-band $$\left(f_o \pm \frac{f_r}{2}\right)$$

as well as a very narrow band centered round the carrier frequency.

As for the volume, it may be provide that the volume of the filters used within the optical equipment is about thirty two times smaller than in a conventional electronic system.

In this case therefore, a thirty two saving in space has been achieved by the invention, with comparable savings in weight and cost. Moreover, the relative gain increases considerably as the range and resolution of the system under consideration are increased.

It will be apparent that many variations in and departures from the embodiments of the invention disclosed herein may be made without exceeding the spirit and scope of the invention.

In particular, the two distinct optical devices respectively involving distance (track 4) and Doppler shift (track 9–14), while advantageously used jointly as disclosed, may have separate utility in certain applications.

In some cases the two intermediate conversion steps of the signal from optical to electrical and back to optical from may be dispensed with. That is, the components designated 5, 6, 30 and 7 in FIG. 1 would be omitted, and the output light beam from distance selection track 4 would be passed directly into the Doppler shift selection track 9. The distance and Doppler selection tracks may, in fact, be combined into a unitary track.

The terms radar and Doppler radar are used herein in a broad sense to designate any system in which wave energy is transmitted into space and energy received from the target in response to the transmitted energy is used to derive information concerning the range, and radial velocity, respectively, of the target. This definition applies not only to systems in which the wave energy used is electromagnetic, but also to systems utilizing other forms of wave energy, in particular acoustic waves, such as sonar.

Radiant energy other than light may be used to produce the beams modulated in accordance with the received radar signal. Distance- and Doppler selection tracks 4 and 9 may be coded otherwise than as variations in optical transparency, since clearly some other radiation-transmission characteristic of the record medium 13 may be used with similar effect, such as reflection coefficient.

Instead of or in addition to modifying the transparencies in the tracks in accordance with weighted values as given by a correcting function, in order to compensate for second-order effects as earlier described, an equivalent result may be obtained by modifying the amplifier gain factors applied to the signals while in their electrical form, (i.e. in the paths from photocells 5 to photosources 7), in accordance with weighted values as given by the said correcting function.

This modification is schematically indicated in FIG. 1 by the showing of gain-adjusting means 31 associated with the amplifiers 30.

Various other modifications may be conceived.

What we claim is:

1. In a radar receiving system having means receiving a radar return signal from a target irradiated with a transmitted radar signal the combination comprising:
   a modulable source (2) of radiation;
   means (1) having an input connected to receive said return signal and an output connected for modulating said source (2);
   a movable record medium (13) having a code (4) recorded thereon in the form of variations in a transmission characteristic of said medium, said variations being represented by substantially the same function in terms of a longitudinal coordinate of said medium, as the function representing the variations in strength of said transmitted radar signal in terms of time; said medium being moved in a direction parallel to said longitudinal coordinate; and
   an array (5) of radiation pickup means distributed in a direction parallel to said longitudinal coordinate for energization with radiation from said modulable source (2) as modified by said varying transmission characteristics of said medium (13) in said code (4);
   whereby the longitudinal position of the energized pickup means in said array (5) will provide an indication of target distance.

2. The combination defined in claim 1, wherein said medium (13) generally has a transmission characteristic representable by zero, and said code (4) comprises a sequence of relatively narrow areas (41, 42, ...) having a transmission characteristic representable by one, spaced along said longitudinal coordinate the width ($L_i$) of said areas representing the duration ($T_i$) of a transmitted radar pulse and the spacing ($L_r$) of said areas representing the repetition period ($T_r$) of the transmitted radar pulses.

3. The combination defined in claim 1, including means for integrating said indication as given by said pickup means over a determined length of said code recorded on said record medium.

4. In a radar receiving system having means receiving a radar return signal from a target irradiated with a transmitted radar signal, said target having a radial velocity relative to the system, the combination comprising:

a modulable source (7–j) of radiation;
transfer means (1, 2, 3, 4, 5, 6, 30, 7) having an input connected to receive said radar return signal and an output connected for modulating said source (7–j);
a movable record medium (13) having a code (9) recorded thereon, said code including a plurality of channels extending along a longitudinal coordinate of the medium and displaced along a transverse coordinate, each channel having alternate areas of different radiation transmission characteristics along said longitudinal coordinate, the pitch spacing of said alternate areas representing a particular Doppler shift period and said pitch spacings varying incrementally from each channel to the next across said code (9) so as to cover a prescribed range of Doppler shift frequencies corresponding to a range of radial velocities of the target; including means for moving said medium (13) in a direction parallel to said longitudinal coordinate;
a set (11) of radiation pickup means distributed in a direction parallel to said transverse coordinate of the medium for energization with transmitted radiation from said modulable source (7–j) as modified by the respective channels of said code (9); whereby substantially only that pickup means of the set (11) whose transverse position corresponds to that of the channel in which said pitch spacing represents the particular period of the Doppler shift component present in said return signal, will be energized; and the said transverse position of the energized pickup means will provide an indication of target radial velocity.

5. The combination defined in claim 4, including means for integrating the transmitted radiation as received by said pickup means (11), over a predetermined length of said code (9).

6. The combination defined in claim 4, wherein said alternate areas in each channel have transmission characteristics representable substantially by (1) and (0).

7. The combination defined in claim 4, wherein said alternate areas in each channel have transmission characteristics representable by two different values affected with weighting coefficients predetermined in accordance with a correcting function.

8. The combination defined in claim 7, wherein said modulable radiation source (7–j) is one of an array (7) of similar such sources spaced parallel to said longitudinal coordinate; and wherein said transfer means includes:
input means (1) connected for receiving said radar return signal;
distance selection means (2, 3, 4, 5) connected for energization from said input means (1) and having a plurality of output channels selectively energizable in accordance with the distance of a target from which said radar return signal was received;
and said combination further includes;
means (6, 30) connecting said output channels of the distance selection means with respective modulable sources of said array (7), whereby the longitudinal position of the energized source in the array will depend on target distance; and
said set of pickup means forms part of an array of similar sets distributed in a direction parallel to said longitudinal coordinate so as to form a two-dimensional matrix array of pickup means (11), whereby the longitudinal and transverse coordinates of an energized pickup means in said two-dimensional matrix array will indicate target distance and target radial velocity, respectively.

9. The combination defined in claim 8, wherein said transfer means further includes fixed-echo rejector filter means (6) in said output channels thereof.

10. The combination defined in claim 8, wherein said matrix array of pickup means (11) comprises separate photoelectric receiver cells (FIG. 6).

11. The combination defined in claim 8, wherein said matrix array of pickup means (11) comprises the photocathode surface of an image-analyzer tube (12).

12. The combination defined in claim 8, including flat diverging bundles of optical fibers (8) arranged for conducting the radiation beams form the respective modulable sources of said array (7) across the width of said code (9).

13. The combination defined in claim 8, wherein said code track (9) is one of at least two similar code tracks (9, 14) each extending over part of the longitudinal extent of said record medium (13) and transversely offset with respect to each other, the radiation beams from said modulable radiation sources (7) extend across the combined transverse width of said tracks, and there are provided arrays (111, 112) of pickup means for the respective tracks.

14. The combination defined in claim 13, wherein said arrays of pickup means (111, 112) constitute respective sections of a common photocathode (11) of an image-analyzer tube.

15. The combination defined in claim 8, wherein the arrangement of the light emissive mosaic corresponds to the arrangement of the photocathode of the image analyzer tube.

16. The combination defined in claim 8, wherein said code track (9) is one of a plurality of similar code tracks (9, 14, 15, 16) provided on a common record medium (13), and switching means (20) are associated with said modulable radiation sources (7, 19) for selectively enabling and disabling said sources in relation to said code tracks.

17. In a radar receiving system having means receiving a radar return signal from a target irradiated with a transmitted radar signal, the target having relative radial velocity with respect to the system, the combination comprising:
a modulable radiation source (2) and means (1) connected for modulating said cource in accordance with the received radar return signal;
record carrier means (13) having a distance selection code (4) and a Doppler selection code (9) recorded thereon; said codes being coded as variations in a radiation-transmission characteristic of said carrier means;
said distance-selection code (4) being represented as substantially the same sequence of variations in said characteristic in terms of a longitudinal coordinate of said carrier means, as the sequence of variations in the strength of said transmitted radar signal in terms of time;
said Doppler selection code (9) comprising a plurality of elementary Doppler code channels extending along a longitudinal coordinate of said carrier means and displaced along a transverse coordinate thereof, each code channel being represented as a sequence of variations in said characteristic along said longitudinal coordinate at a space frequency corresponding to a particular Doppler shift frequency;
means moving said record carrier means (13) past said moduable source of radiation (2); whereby the modulated radiation from said source interacts with said record carrier means (13) and produces an output radiation beam which is modulated as the resultant of the modulation of said source (2) modified by the variations in radiation-transmission characteristic of both said distance and Doppler selection codes;

the position of said output beam along said longitudinal and transverse coordinates (X, Y) respectively indicating the target distance and radial velocity; and indicating means (11) positioned for receiving said output beam and indicating the coordinates thereof.

18. The combination defined in claim 17, wherein said record carrier means (13) comprises a common revolving member, said distance-selection code (4) and Doppler selection code (9) comprise coaxial circumferential tracks coded as variations in the transparency of said member; and further including:

opto-electric conversion means (5) picking up said modulated beam from the source (2) as it issues through said distance-selection code track (4) and converting the beam into an electric signal delivered over one of a set of distance channels;

electric circuit means (6, 30) connected in the respective distance channels for processing the signals therein;

electro-optical conversion means (7) connected to receive the electric signal from each of the respective distance channels and convert the signal into a beam irradiating said Doppler selection track (9) in a position, as measured on said longitudinal coordinate, corresponding to the particular distance channel.

19. The combination defined in claim 18, wherein said electric circuit means includes filtering (6) and amplifying (30) means.

20. The combination defined in claim 19, wherein said record carrier (13) comprises a revolving drum and said coaxial tracks (4, 9) are formed round the drum periphery; said modulable radiation source (2) is mounted outside the drum, said opto-electric and electric-optic conversion means (5, 7) are mounted inside the drum, and said indicating means (11) is mounted outside the drum.

References Cited

UNITED STATES PATENTS

| | | | |
|---|---|---|---|
| 3,184,679 | 5/1965 | Kuehne | 324—77 |
| 3,355,579 | 11/1967 | Robertson | 324—77 |

RODNEY D. BENNETT, JR., *Primary Examiner*

H. C. WAMSLEY, *Assistant Examiner*

U.S. Cl. X.R.

235—181; 324—77